Feb. 26, 1946. M. F. NEUHOF 2,395,679
SUBMARINE DETECTING BUOY
Filed May 11, 1942 6 Sheets-Sheet 3

INVENTOR.
MAURICE F. NEUHOF
BY
Armand E. Massern
ATTORNEY,

Feb. 26, 1946.     M. F. NEUHOF     2,395,679
SUBMARINE DETECTING BUOY
Filed May 11, 1942     6 Sheets—Sheet 6

INVENTOR.
MAURICE F. NEUHOF.
BY
ATTORNEY.

Patented Feb. 26, 1946

2,395,679

UNITED STATES PATENT OFFICE 2,395,679

SUBMARINE DETECTING BUOY

Maurice F. Neuhof, New York, N. Y.

Application May 11, 1942, Serial No. 442,535

5 Claims. (Cl. 177—386)

This invention relates to anchored signal stations, and more particularly to a buoy having means for receiving sound and translating it into electric radiant energy.

In accordance with my invention I provide a buoy including a float and a body mounted thereabove and arranged for receiving electric mechanisms. The buoy preferably comprises a stabilizer weight connected with an anchor and secured to the lower surface of the float. The stabilizer weight serves to keep the buoy in a stable position, regardless of the movement of the water caused by wind or current.

The buoy of the present invention comprises means for receiving sound and operating a transmitter in accordance with the intensity of the received sound. In accordance with my invention a plurality of buoys are anchored in the vicinity of the shoreline in a prearranged manner, each of the buoys being designed for detecting and indicating remotely the presence of any submarine. Preferably, each buoy is provided with means for distinguishing the intensity of the sound caused by a submarine according to its distance from the buoy. The buoy may e. g. have electrical and mechanical means for detecting and indicating the presence of a submarine within five miles, three miles and one mile from the buoy. If the buoys are spaced at a distance of less than five miles, the approximate position or direction of movement of an enemy submarine can be plotted by comparing the intelligence received from two or more buoys.

To this end each buoy has e. g. three insulating tapes provided with perforations arranged according to a predetermined code. Each of the three tapes is adapted to operate a transmitter. The transmitter then radiates the prearranged code represented by the perforations of the selected tape by means of a selective mechanism which is responsive to the received sound. A mechanical or electrical time switch may be used for disconnecting the transmitter from its current source so that the transmitter only radiates within predetermined periods of time.

Furthermore, an apparatus is provided for disconnecting the transmitter in response to predetermined electric signals received from friendly ships or submarines. Such predetermined signals are transmitted on a prearranged wave length and in predetermined sequences, corresponding to a code. This code may be changed periodically.

It is accordingly an object of my invention to provide an improved buoy having means to keep it buoyant in the water and in a stable position regardless of the weather. Another object of the invention is to provide a buoy having watertight compartments for housing electric mechanisms and accumulators for the operation thereof, and a stabilizer weight for keeping the buoy in a stable position. Still another object of the invention is to provide an electric system housed in a buoy and including a transmitter, a receiver and a sound-controlled mechanism for operating the transmitter in dependence upon the intensity of the received sound. These and further objects of the invention will become more apparent when the description proceeds taken in connection with the drawings, wherein:

Referring to the drawings, and more particularly to Figs. 1 to 5, the buoy of the invention comprises a substantially cylindrical float, generally indicated at 20, and a pear-shaped body 21 mounted thereabove. Pear-shaped body 21 has eight sustaining girders 22 to 29 clearly shown in Fig. 5. Each of girders 22 to 29 consists of a T-beam. The top of pear-shaped body 21 is formed by spherical calotte 30 which serves for securing the tips of girders 22 to 29. Spherical member 30 is rigidly secured to ball 31 bearing hoisting ring 32 rotatably mounted thereon. Pear-shaped body 21 is provided with ring 33 secured to girders 22, 24, 26 and 28 clearly shown in Fig. 5. Ring 33 supports circular plate 34 illustrated in Figs. 2 and 3. Plate 35 is supported in a similar manner by ring 36. Plates 34 and 35 form an interior space which is subdivided by plate 38 into two upper chambers 40 and 41. In a similar manner a lower compartment 42 is formed below plate 35 and above plate 43. Plate 43 is supported by ring 44 which in turn is secured to girders 22 to 29. Pear-shaped body 21 is enclosed by a metal skin 45 between float 20 and circular plate 34.

Figure 2:
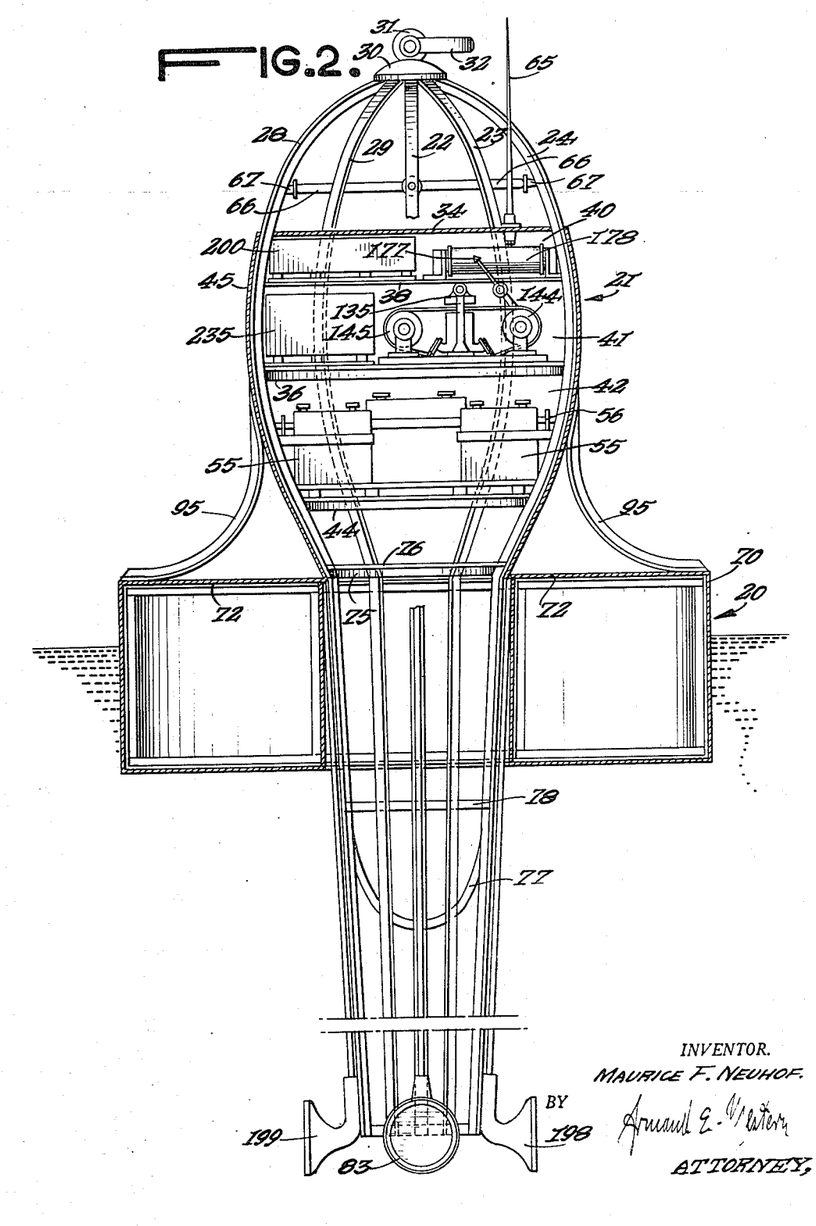
Fig. 2 is a front view of the buoy of Fig. 1 with parts broken away and taken substantially on the line 2—2 of Fig. 3.
Figures 3, 12:
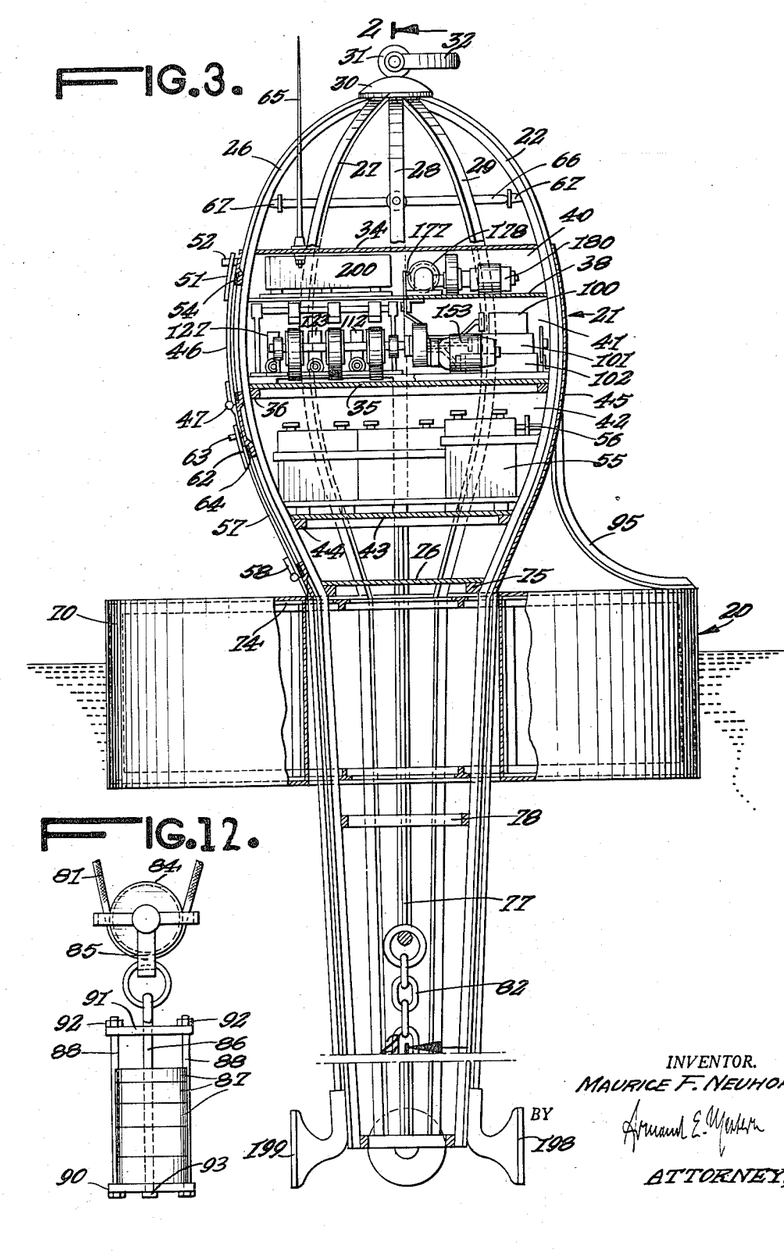
Fig. 3 is a vertical sectional view of the buoy taken on the line 3—3 of Fig. 1 and illustrates the electric mechanism in the watertight compartments of the buoy.
Fig. 12 is a front view of a stabilizer weight attached to the buoy to keep it in stable position in the water.
Figure 4:
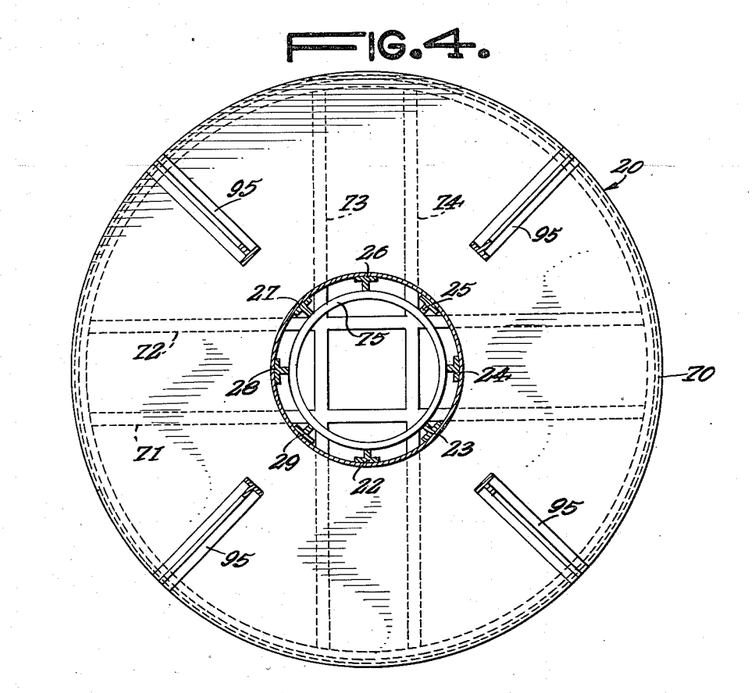
Fig. 4 is a horizontal sectional view taken on the line 4—4 of Fig. 1, illustrating the construction of the float.
Figure 5:
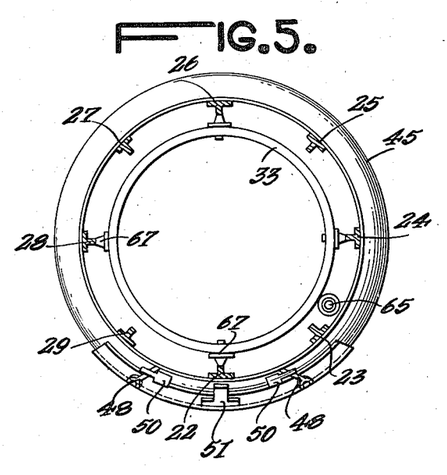
Fig. 5 is a horizontal sectional view taken on the line 5—5 of Fig. 1 and showing the construction of the pear-shaped body which houses the electrical mechanisms.

Compartments 40 and 41 are provided with door 46 secured to skin 45 by hinges 47. Door 46 is further provided with two latches 48 engageable with noses 50 on skin 45. Door 46 has a lock plate 51 engageable with hook 52 which may be locked by a key locker. As shown in Fig. 3, door 46 has rubber inserts 54 to assure that compartments 40 and 41 are watertight. The lower compartment 42 houses a plurality of accumulators 55 which are secured by any suitable fastening means 56. Compartment 42 is provided with door 57 having hinges 58. Door 57 is latched by latches 60 engageable with noses 61. Lock plate 62 engages with nose 63 which may be locked by a key locker. Door 57 is also provided with a watertight rubber insert 64 for making compartment 42 waterproof. Upper plate 34 is provided with a vertical antenna 65 which is electrically connected with a receiver as will be explained in more detail hereinafter. Loop antenna 66 is substantially ring-shaped and is connected with girders 22, 24, 26 and 28 by insulated members 67. Ring antenna 66 is hooked up with a radio frequency transmitter. Float 20, shown particularly in Figs. 2 and 4, is enclosed by metal skin 70 which is reinforced by four intersecting sustaining girders 71, 72, 73 and 74. Each of girders 71 to 74 is substantially rectangular, as illustrated in Fig. 2. Ring 75 is secured to girders 22 to 29 as shown in Fig. 4 and supports circular plate 76 for reinforcing the body and float structures clearly shown in Figs. 2 and 3. Girders 22 to 29 extend below float 20. Hook 77 is secured to ring 78 which in turn is fastened to girders 22 to 29. Float 20 has a hook 80 secured to its lower portion, on which cable 81 is fastened. Hook 77 supports chain 82 which in turn sustains pulley 83. Cable 81 having one end secured to hook 80 is guided over pulley 83 and supports pulley 84 which is illustrated in Fig. 12. Pulley 84 is arranged between hook 80 and pulley 83 and is connected by means of hook 85 with central rod 86 supporting weight 87. Two rods 88 are secured between plates 90 and 91. By removing screws 92 rods 88 may be removed, and by unscrewing screw 93 plate 90 may be removed to exchange weights 87.

The free end of cable 81 is provided with an anchor, not shown in the drawings. When the buoy of the invention is anchored, pulley 84 and weights 87 serve as a stabilizing means. They insure that the buoy always floats above the anchor, regardless of the weather. Float 20 is connected with pear-shaped body 21 by curved reinforcing members 95.

Figure 6:
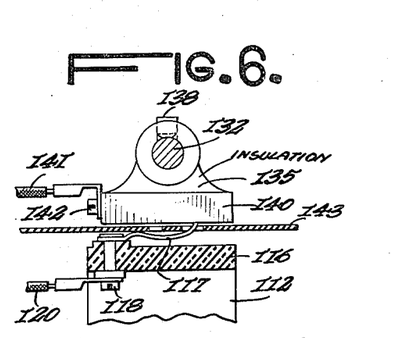
Fig. 6 is a vertical sectional view of a spring contactor in its operative position and its associated insulating tape.
Figure 7:
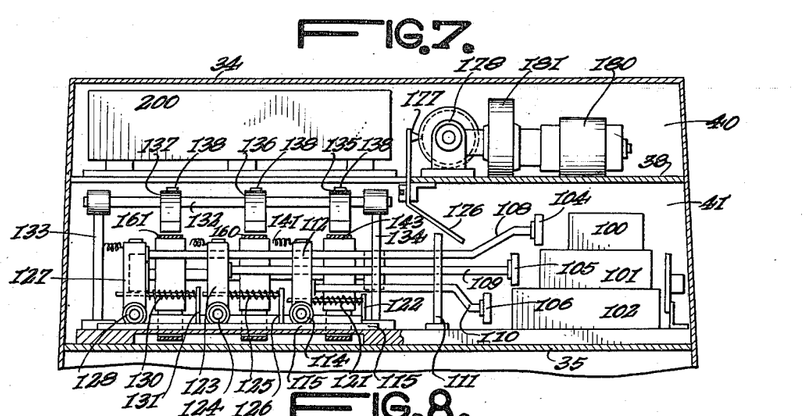
Fig. 7 is a side view of one of the buoy compartments illustrating the spring contactors, tapes and associated mechanisms for selectively operating the transmitter, parts being broken away.
Figure 8:
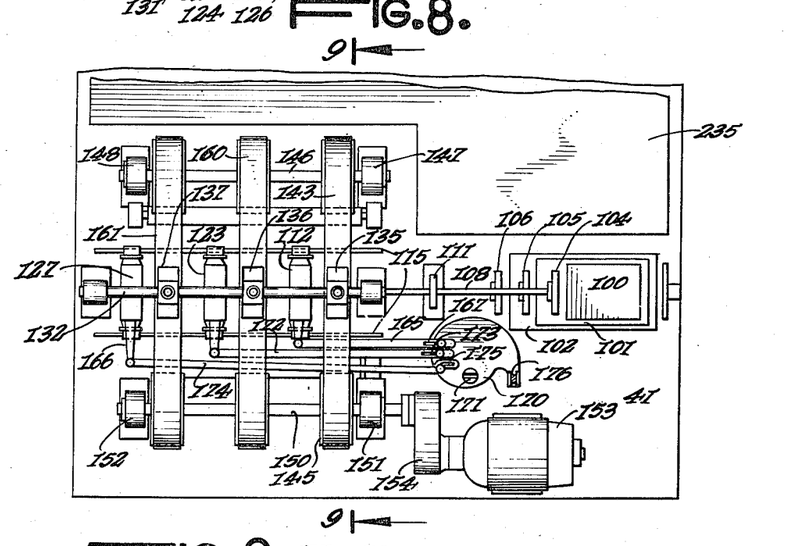
Fig. 8 is a plan view of the mechanism of Fig. 7 for selectively operating the transmitter in dependence upon the received sound.
Figure 9:
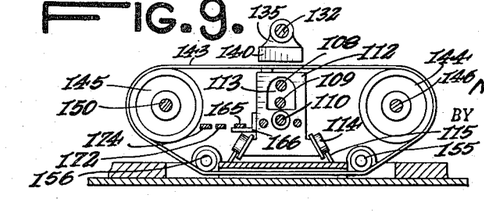
Fig. 9 is a vertical sectional view of one of the insulating tapes for transmitting code signals and associated parts, taken substantially on the line 9—9 of Fig. 8.

Compartments 40 and 41 and the mechanical and electrical equipment housed therein are shown in greater detail in Figs. 7 to 9. Compartment 41 houses three electro-magnets 100, 101 and 102 which are energized by a relay to be described hereinafter. Armature plates 104, 105 and 106 are arranged to be attracted by electro-magnets 100, 101 and 102, respectively. Armatures 104, 105 and 106 are secured to rods 108, 109 and 110, respectively, which are passed through appropriate holes in bracket 111. Rod 110 is secured to carriage 112, as shown particularly in Fig. 9. Carriage 112 has a U-shaped cut-out 113 through which rods 108 and 109 are passed. Carriage 112 has two wheels 114 rolling over rails 115. As shown in Fig. 6, carriage 112 bears insulating plate 116 above which contactor leaf spring 117 is mounted by stud screw 118. Cable 120 is electrically connected through stud screw 118 with contactor spring 117. Carriage 112 is urged by spring 121 bearing against plate 122 to the left of Fig. 7. Carriage 123, mounted on wheels 124, is connected with rod 109. Carriage 123 has a cut-out for passing rod 108 therethrough. Carriage 123 has a contactor leaf spring, similar to the one shown in Fig. 6. Spring 125, bearing against plate 126, urges carriage 123 to the left of Fig. 7. Carriage 127, mounted on wheels 128, is connected with rod 108 and is normally urged by spring 130 bearing against plate 131 to the left of Fig. 7.

Rod 132 is rigidly mounted on standards 133 and 134. Three insulating blocks 135, 136 and 137 are secured by screws 138 to rod 132. Block 135 bears a metal plate 140, clearly shown in Fig. 6, which is connected with cable 141 by screw 142. Insulating tape 143 moves below plate 140 of insulating block 135. Tape 143 is guided by rollers 144 and 145 shown in Fig. 9. Roller 144 is secured to shaft 146 journalled in bearings 147 and 148. Roller 145 is mounted on drive shaft 150 journalled in bearings 151 and 152. Motor 153 drives shaft 150 through gear box 154. Tape 143 is further guided by idle rollers 155 and 156. Insulating block 136 is associated with insulating tape 160 which is driven and guided in a similar manner as tape 143. Tape 161 is arranged below insulating block 137.

The tape and spring contactor mechanism described in connection with Figs. 6 to 9, operates as follows.

Supposing electro-magnet 102 is energized, it will attract its armature 106 causing a movement of rod 110 towards the right of Fig. 7. This in turn causes movement of carriage 112 towards the right against the action of spring 121 until contactor leaf spring 117 is below metal plate 140 of insulating block 135. Perforations provided in insulating tape 143 allow leaf spring 117 to contact plate 140 and thus to connect cable 120 with cable 141. Similarly, if electro-magnet 101 is energized, it will attract its armature 105, causing a movement of carriage 123 towards the right against the action of spring 125 until it is positioned below tape 160. Energizing of electro-magnet 100 causes movement of carriage 127 towards the right for cooperation with insulating tape 161.

Carriage 112 is connected with rod 165 by means of bracket 166. Rod 165 has a slot 167 to provide a sliding connection with eccentric 170, journalled by means of screw 171. Rod 172 is connected with carriage 123 and bears a slot 173 providing a sliding connection with eccentric 170. Rod 174 is connected with carriage 127 and has a slot 175 for rotating eccentric 170. Eccentric 170 is connected by linkage 176 with recording pen 177 for actuation thereof. Pen 177 is adapted to move over record drum 178, shown particularly in Figs. 2 and 7. Record drum 178 is rotated by means of electric motor 180 through gear box 181. Gear box 181 contains a reducing gearing so that drum 178 is rotated at a very low speed.

It will now be obvious that recording pen 177 is displaced over record drum 178 in response to the selective energization of electro-magnets 100, 101 and 102 due to the connecting linkage between carriages 127, 123 and 112, respectively, and recording pen 177. Recording pen 177 thus produces a permanent record on drum 178 showing the distance of an enemy submarine from the buoy as well as the length of time, each of carriages 127, 123 and 112 is energized.

The buoy of the invention contains means for receiving sound and translating it into electric energy which is radiated to indicate the presence of a submarine near the buoy. The apparatus for attaining this purpose is shown in the electric circuit diagram of Fig. 11. Transmitter 200 is also shown schematically in compartment 40 illustrated in Fig. 7. Transmitter 200 is electrically connected with loop antenna 66. One pole of electric battery 201 is connected with transmitter 200 by lead 202. The other pole of battery 201 is connected by lead 203 with time switch 204, shown schematically only because time switches are well known to those skilled in the art. Time switch 204 contains electrical or mechanical means for opening and closing the electric connection between leads 203 and 205. Time switch 204 may e. g. contain a clock movement or it may be controlled through transmitter 200.

Switch 206 is normally closed and connects lead 205 with connection 207. Lead 207 is connected with the tape and spring contactor, indicated schematically at 208. Tape and spring contactor 208 corresponds to leaf spring 117, tape 143 as shown in Fig. 6 and similar contactor leaf springs and tapes associated with carriages 123 and 127. Tape and leaf contactor 208 is connected with transmitter 200 through lead 210.

Figure 1:
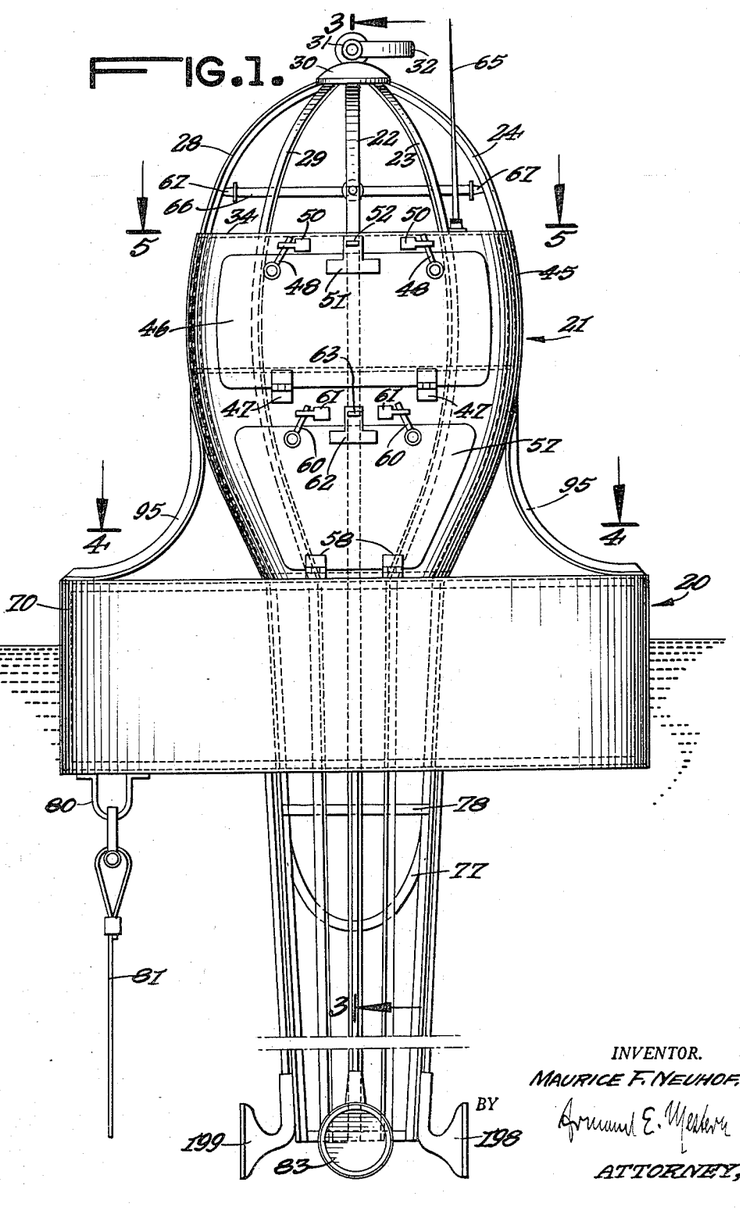
Fig. 1 is a front view of a buoy embodying the present invention.

Electro-magnets 100, 101 and 102 are selectively energized in dependence upon the intensity of the sound received by two microphones and amplifier arrangements 211 and 212. As shown in Figs. 1 and 2, microphones 198 and 199 are arranged at the lower end of girders 22 to 29 at such a depth that they can effectively pick up the sound produced by a submarine. Microphones 211 and 212 are connected in parallel with battery 213. The electric output of the two microphones is amplified as indicated schematically in Fig. 11. The amplified output of microphone and amplifier arrangements 211 and 212 are connected in parallel and fed to relay 214. Armature 215 of relay 214 is provided with a rack 216 cooperating with gear 217 to which contactor arm 218 is secured.

According to the intensity of the sound received by microphones 198 and 199, armature 215 is moved a larger or smaller distance into relay 214 causing a rotation of contactor arm 218 through a larger or smaller angle.

One pole of battery 220 is connected with contactor arm 218 through lead 221. Spaced contactor segments 222, 223 and 224 are connected respectively with electro-magnets 102, 101 and 100 through leads 225, 226 and 227. The electric circuit from battery 220 to electro-magnets 102, 101 and 100 is closed through lead 228, time switch 230 and lead 231. Time switch 230 preferably is designed similar to time switch 204 and operates in unison therewith.

Switch 206 interposed into the electric circuit operating transmitter 200, is responsive to predetermined signals received by receiver 235. Receiver 235 is shown schematically in Fig. 8 and is connected with antenna 65. Receiver 235 is tuned to a prearranged wave length. If receiver 235 receives a predetermined sequence of code signals, selector relay 237 passes the output of receiver 235 onto relay 240 which then opens switch 206 to interrupt the circuit of transmitter 200. Motors 242 and 243 are connected in series with battery 241. Motor 242 corresponds to motor 180 driving recording drum 178. Motor 243 corresponds to motor 153 driving shaft 159 for moving tapes 143, 160 and 161.

Figure 10:
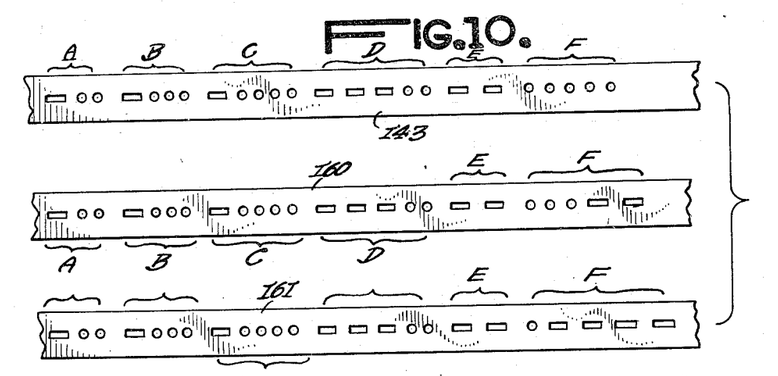
Fig. 10 is a plan view of three insulating tapes bearing coded perforations.

Tapes 143, 160 and 161 are shown in detail in Fig. 10. The tapes may be made for instance of materials known under the trade names of "Lucite," "Plexiglas," "Bakelite" and the like insulating materials. Each tape 143, 160 and 161 bears six groups of perforations A, B, C, D, E and F in the example illustrated corresponding to predetermined code signals. Code signals A, B, C, D and E stand correspondingly for the designations "db 68 m." "Db 68" stands for the number of the buoy and "m" stands for miles. The last code signal F is different on each of the three tapes 143, 160 and 161. Code signal F on tape 143 stands for numeral "5." Code signal F on tape 160 stands for the figure "3" and code signal F on tape 161 stands for the figure "1," indicating the approximate distance of the received sound from the buoy.

It is of course to be understood that the coded perforations on the three insulating tapes could be chosen differently from the example illustrated in the drawings. Furthermore, the electric mechanism illustrated particularly in Fig. 11 may be changed to indicate other distances of the received sound from the buoy. To this end it would simply be necessary to redesign microphone and amplifier arrangement 211 and 212.

Figure 11:
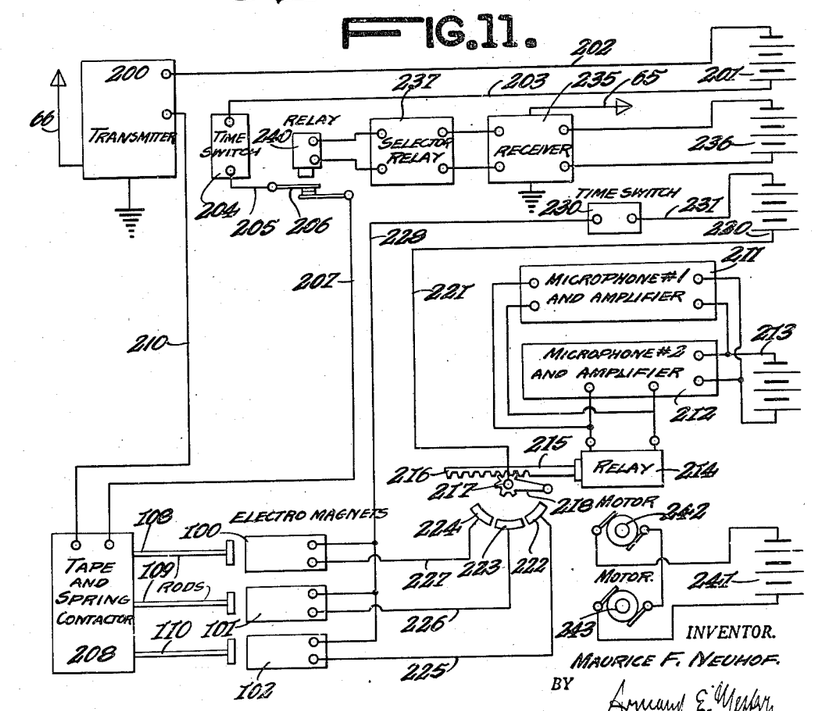
Fig. 11 is a schematic electrical diagram of the transmitter and receiver circuits.

The mode of operation of the electric mechanism illustrated in Fig. 11 will now be evident. Motors 242 and 243 are driven continuously by their battery 241. Hence, recording drum 178 as well as the three insulating tapes 143, 160 and 161 are rotated continuously. When a sound is picked up by microphones 198 and 199, it is properly amplified and causes energization of relay 214 corresponding to the intensity of the received sound. Relay 214 in turn connects one of the electro-magnets 100, 101 and 102 with battery 220, depending upon the angular position of contactor arm 218. Now, one of the three carriages 112, 123 and 127 is moved into its operative position below its associated tape. In case switch 206 is closed and time switch 204 permits the passage of current from battery 201 through tape and spring contactor 208, transmitter 200 radiates electric signals in a sequence corresponding to the perforations on the selected tape. Transmission of the code signals is interrupted after a predetermined period of time by time switch 204. Time switch 230 operates in unison with time switch 204 and deenergizes the selected electro-magnet. Recording pen 177 is moved over recording drum 178 in accordance with the energization of the selected electro-magnet to produce a permanent record of the operation of the device.

In accordance with the invention it is possible to interrupt the transmission of the coded signals when a friendly ship or submarine approaches the buoy. To this end, the friendly ship or submarine transmits a predetermined signal which is received by receiver 235. The output of receiver 235 is connected with relay 240 if the received message contains the correct code signal through the intermediary of selector relay 237. Energization of relay 240 causes opening of switch 206, thus interrupting the electric circuit energizing transmitter 200.

Preferably a plurality of buoys is arranged at a distance of less than the maximum distance within which a sound is picked up and amplified by microphone and amplifier arrangement 211 and 212. Thus it is possible to plot the approximate position and direction of movement of an enemy submarine if its presence is indicated by more than one buoy.

Various changes and modifications may be made in the details of construction of the invention as described without departing from the broader spirit and scope thereof, set forth in the following claims.

I claim:

1. A buoy having an electrical system comprising at least one microphone for picking up sound and translating it into electric energy, a first relay arranged for energization by said microphone with an intensity in dependence upon the intensity of the received sound; a plurality of switches a plurality of electro-magnets, each being in circuit with a current source and one of said switches, said switches being arranged for successive actuation by said first relay in dependence upon the intensity of the energization thereof; a transmitter for transmitting predetermined signals; a plurality of mechanical devices, each being associated with one of said electro-magnets and operable thereby, each of said devices including means for energizing said transmitter for transmitting a different signal; and a receiver for receiving coded radio signals, a second relay connected with the output of said receiver, a further switch being normally closed and arranged in the circuit of said transmitter, said further switch being arranged for actuation by said second relay, whereby said transmitter is disconnected from its current source when said receiver receives a predetermined coded signal.

2. A buoy having an electrical system comprising at least one microphone for picking up sound and translating it into electric energy, a first relay energized by said microphone with an intensity in dependence upon the intensity of the received sound; a plurality of switches a plurality of electro-magnets, each being in circuit with a current source and one of said switches, said switches being arranged for successive actuation by said first relay in dependence upon the intensity of the energization thereof; a transmitter for transmitting predetermined signals; a plurality of mechanical devices, each being associated with one of said electro-magnets and operable thereby, each of said devices including means for energizing said transmitter for transmitting a predetermined signal; and a receiver for receiving signals of a predetermined frequency, a selector relay, the output of said receiver being connected with said selector relay, a further relay connected with the output of said selector relay, a further switch normally closed and arranged in the circuit of said transmitter, said further switch being arranged to be attracted by said further relay, whereby said transmitter is disconnected from its current source when said receiver receives a predetermined signal.

3. A buoy comprising a transmitter, a device associated with said transmitter for the selective energization thereof, said device including a plurality of insulating perforated tapes, means for moving said tapes, a plurality of electro-magnets, means for selectively energizing said electro-magnets, a plurality of slidable carriages, each being associated with one of said electro-magnets and with one of said tapes, each of said carriages being normally spaced from its associated tape and arranged to be attracted by its associated electro-magnet and displaced into a position below one of said tapes, a spring contactor on each of said carriages in circuit with said transmitter, and a fixed contact above each of said tapes arranged for cooperation with one of said spring contactors, whereby, when one of said carriages is moved into the operative position by the energization of its associated electro-magnet, its associated spring contactor contacts its fixed contact through the perforations in the associated tape for energizing said transmitter for predetermined periods of time.

4. A buoy comprising a transmitter, a device associated with said transmitter for the selective energization thereof, said device including a plurality of perforated tapes of insulating material, means for continuously advancing said tapes, a plurality of electro-magnets, means for selectively energizing said electro-magnets, a plurality of slidable carriages, each being associated with one of said electro-magnets and with one of said tapes, each of said carriages being normally spaced from its associated tape and arranged to be attracted by its associated electro-magnet and displaced into a position below one of said tapes, a spring contactor on each of said carriages in circuit with said transmitter, a fixed contact above each of said tapes arranged for cooperation with one of said spring contactors, whereby, when one of said carriages is moved into the operative position by the energization of its associated electro-magnet, its associated spring contactor contacts its associated fixed contact through the perforations in the associated tape for energizing said transmitter in dependence upon the perforations of the selected tape, a recording drum, means for rotating said recording drum, a recording pen, and a linkage between said recording pen and each of said carriages for moving said recording pen over said recording drum in dependence upon the displacement of the selected carriage.

5. In a waterborne float an electrical system comprising at least one microphone for picking up sound and translating it into electric energy, a relay energized by said microphone with an intensity in dependence upon the intensity of the received sound; a plurality of switches arranged for successive actuation by said relay in dependence upon the intensity of the energization thereof, a plurality of electro-magnets, each being in circuit with a current source and one of said switches; a transmitter for transmitting predetermined signals; and a plurality of mechanical devices, each being associated with one of said electro-magnets and operable thereby, each of said devices including means for energizing said transmitter for transmitting a predetermined signal, each of said devices including an insulating perforated tape, means for moving said tape, a slidable carriage associated with said tape and with one of said electro-magnets, said carriage being normally spaced from its associated electro-magnet and arranged to be attracted thereby and displaced into a position below said tape, a spring contactor on said carriage in circuit with said transmitter, and a fixed contact above said tape arranged for cooperation with said spring contactor for energizing said transmitter for predetermined periods upon displacement of said carriage.

MAURICE F. NEUHOF.